United States Patent [19]
Young

[11] 3,814,244
[45] June 4, 1974

[54] APPARATUS FOR FRACTIONATING FLUID SUSPENSIONS

[75] Inventor: Douglas L. G. Young, Pierrefonds, Quebec, Canada

[73] Assignee: Canadian Ingersoll-Rand Company Limited, Montreal, Quebec, Canada

[22] Filed: May 30, 1972

[21] Appl. No.: 257,767

[52] U.S. Cl. ............... 209/273, 209/306, 209/366.5, 210/388, 210/411, 210/DIG. 18
[51] Int. Cl. ............................................ C10g 31/14
[58] Field of Search .... 209/270, 273, 300, 303–306, 209/326, 332, 367, 384, 360, 366.5; 210/195, 247, 304, 360, 360 A, 415, 388, 411

[56] References Cited
UNITED STATES PATENTS

| | | | |
|---|---|---|---|
| 2,464,581 | 3/1949 | Jonsson | 209/270 |
| 2,500,965 | 3/1950 | Symons | 209/303 |
| 2,950,819 | 8/1960 | Holman et al. | 209/326 |
| 3,047,492 | 7/1962 | Gambrel | 210/195 X |
| 3,446,665 | 5/1969 | Castiello et al. | 209/273 X |
| 3,458,038 | 7/1969 | Young | 209/273 X |
| 3,498,456 | 3/1970 | Childs et al. | 209/332 X |
| 3,616,703 | 11/1971 | Waschulewski et al. | 209/366.5 X |
| 3,616,904 | 11/1971 | Aremag | 209/367 X |

FOREIGN PATENTS OR APPLICATIONS 950,628 10/1956 Germany ........................... 209/306

Primary Examiner—John Adee
Assistant Examiner—Robert H. Spitzer
Attorney, Agent, or Firm—Robert R. Pacquin

[57] ABSTRACT

Fractionating apparatus comprising a plurality of annular walls spaced one inside the other, at least one of which walls is a screen. The apparatus includes rotary drive shaft means having a portion connectible to a driving means and a portion eccentric to such connectible portion; and one of the annular walls is connected to the eccentric portion of the drive shaft means to be orbitally driven during the driven rotation of the drive shaft means.

19 Claims, 16 Drawing Figures

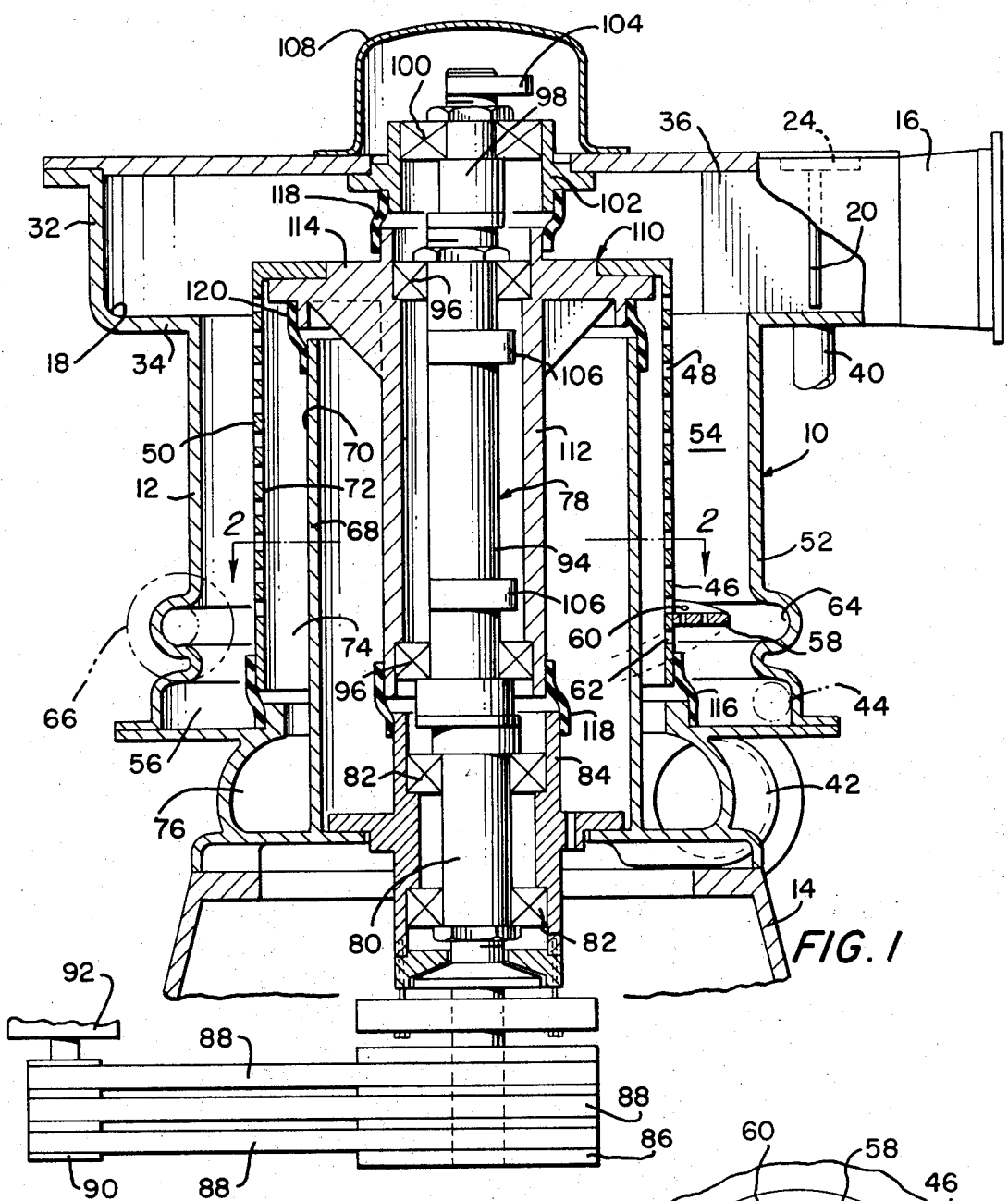
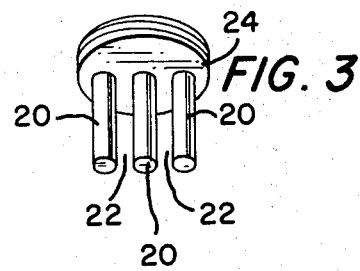
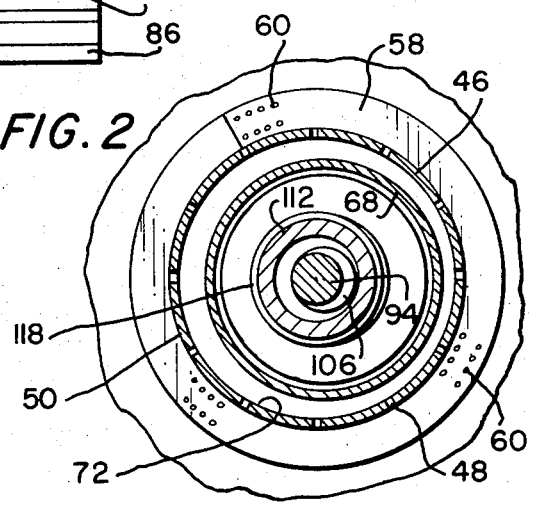
FIG. 1
FIG. 2
FIG. 3

APPARATUS FOR FRACTIONATING FLUID SUSPENSIONS

The present invention relates to apparatus for frationating a fluid suspension and more specifically to apparatus of this type particularly adapted for fractionating a liquid suspension containing solid material such as, by way of example only, the slurries processed during the manufacture of pulp and paper.

Fractionating apparatus employed during the manufacture of pulp and paper includes both coarse screening apparatus and fine screening apparatus. The coarse screening apparatus includes knotters and bull screens and typically has screening apertures of one-quarter inch or greater; the fine screening apparatus usually has screening apertures of one-eighth inch or less or slots of forty-thousanths inch or less.

Traditionally, a coarse screening apparatus for such use was non-pressurized and included a generally flat, horizontal or inclined screen plate which was vibrated during the machine operation. This form of coarse screening apparatus was, however, in operation subject to excessive foaming and aeration of liquor due to excessive mixture of air with the liquor, thereby causing undesirable liquor losses and pollution and necessitating increased capital and operation costs in the further treatment of the suspension. In addition, apparatus of this traditional construction was incapable of removing gravel, grit and similar solid material of smaller size than the screen perforations and resultantly required further treatment of the suspension for the removal of such smaller solid material. Moreover, as the apparatus was non-pressurized, it required either installation at an elevation higher than the following equipment or the provision of additional pumping systems for handling the discharge flows.

More recently, pressurized coarse screening apparatus was developed, the pressurization of the apparatus being intended to reduce the total capital and operating costs necessitated by the earlier, traditional, unpressurized, vibratory screening apparatus and also eliminate the undesirable foaming of the latter. Conventional pressurized coarse screening apparatus is, however, dependent for successful operation on rotary screening devices which, at least in some instances, cause undesirable break-up of knots and degradation of accepts with knot fragments and/or is subject to screen plugging. Also, conventional coarse screening apparatus of this type is subject to high loss of desirable material or fiber to the rejects, thus requiring the employment of additional equipment for recovery of such material. This additional equipment normally has taken the form of a vibratory screen of the general type used as the beforedescribed traditional coarse screening apparatus, and is resultantly subject to the earlier described disadvantages of apparatus of its type. Moreover, conventional pressurized coarse screening apparatus normally requires the employment of a cyclone for removal of material such as gravel.

Conventional fine screening apparatus typically was constructed in the form of either vibratory apparatus, having a generally flat horizontal or inclined screen plate, or rotary unpressurized screens. Such vibratory apparatus is now, however, generally considered to be undesirable for fine screening due to its relatively high purchase, installation and maintenance costs, low throughput, and inability to process other than very low consistency suspensions.

The rotaty, unpressurized screens used for fine screening generally are less efficient than the vibratory apparatus for their purpose, but are normally of lower capital and installation costs, higher capacity and simplier to operate and maintain. However, such apparatus is prone to screen plugging and discharge of desirable material to sewer with resultant pollution, loss of valuable material or cost of recovery. Also such apparatus is only partially effective in operation in that it is capable only of removing slivers and requires additional processing for the removal of other undesirable material in the suspension. Furthermore, as it is unpressurized foaming and aeration may be again problems in the operation of this apparatus.

More recently, rotary pressurized screening apparatus has been provided for use in the fine screening operation. Generally considered, such rotary pressurized screening apparatus has minimized many of the problems arising from the use of rotary unpressurized screening apparatus. However, even conventional rotary pressurized fine screening apparatus primarily removes only slivers from the suspension, thus requiring the use of cyclones for the removal of short undesirable material and inorganics in the suspension; and such cyclones, not being fully pressurized, during their operation may cause undesirable aeration and/or the generation of foam. Moreover, conventional high speed, pressurized rotary fine screening apparatus is subject to abrasive wear, susceptible to cavitation damage in modern high temperature systems and has high power requirements.

In addition to the beforedescribed apparatus, other apparatus was contemplated, but probably never constructed, for fractionating a liquid suspension such as a pulp slurry. For example, German Pat. No. 599,616 and 707,926 both disclose screening apparatus employing eccentric weights. The apparatus of these German Patents are, however, unbalanced and hence would require extremely heavy foundations and cause excessive vibration during operation. Moreover, such apparatus are inherently limited to the processing of low consistency suspensions and provide only sifting or gauging effects without the high vortical velocity which is the basis of efficient sliver removal. In addition, the apparatus of German Patent No. 599,616 is further undesirable in that it ($i$) is incapable of insuring that the movable elements vibrate in controlled orbits or paths, ($ii$) is an open unit subject to foaming and aeration, and ($iii$) is capable of only low throughout rates dictated by differential inlet and discharge heads.

An object of the present invention is to provide a new and improved apparatus for fractionating a fluid suspension, which apparatus is particularly constructed and arranged to substantially minimize and/or avoid the beforedescribed disadvantages and deficiencies of prior apparatus for its purpose.

Another object of the invention is to provide new and improved apparatus for fractionating a fluid suspension, which apparatus in one form of construction is capable of successfully providing coarse screening and in another, alternative form of construction is capable of sucessfully providing fine screening.

Another object is to provide a new and improved apparatus which is particulary constructed and arranged to avoid the necessity for rotary screening devices, thereby minimizing the need for rotating seals and avoiding other problems inherent in the use of such rotaty screening devices.

Another object is to provide a new and improved apparatus which is particularly constructed and arranged to include a balanced orbital element movable in a controlled orbit.

Another object is to provide a new and improved apparatus which, when embodied in a construction for coarse screening, avoids foaming and aeration of the suspension, is capable of separating gravel, inorganic material and the like, and discharges rejects substantially free of desirable material.

Another object is to provide a new and improved apparatus which, when embodied in a construction for fine screening, enables deflocculation by hydrodynamic forces and posseses only relatively low power requirements.

Another object is to provide a new and improved apparatus which is highly efficient in operation and relatively economical in total costs of installation, operation and maintenance.

Another object is to provide a new and improved apparatus of the type set forth which is fully pressurized.

Other objects and advantages of the invention will be apparent from the following description taken in connection with the accompanying drawings wherein, as will be understood, the preferred embodiments of the invention have been given by way of illustration only.

In accordance with the invention, an apparatus for fractionating a fluid suspension, may comprise a plurality of annular walls spaced one inside the other, at least one of such walls including screening openings adapted for accepting a fraction of a fluid suspension and rejecting another fraction thereof, rotatable drive shaft means including a first portion and a second portion eccentric to such first portion, at least one of the walls being orbitally movable, means connecting the orbitally movable wall to the eccentric portion of the drive shaft means to cause rotation of the drive shaft means through the first portion thereof to provide orbital movement of the orbitally movable wall, and means for restraining rotation of said orbitally movable wall during its said orbital movement.

Referring to the drawings:

FIG. 1 is an elevational sectional view of an apparatus constructed in accordance with one embodiment of the invention;

FIG. 2 is a fragmentary sectional view of such apparatus taken on Line 2—2 of FIG. 1, looking in the direction of the arrows;

FIG. 3 is a perspective view illustrating the pre-screening means of the apparatus shown in FIG. 1;

Figure 13:
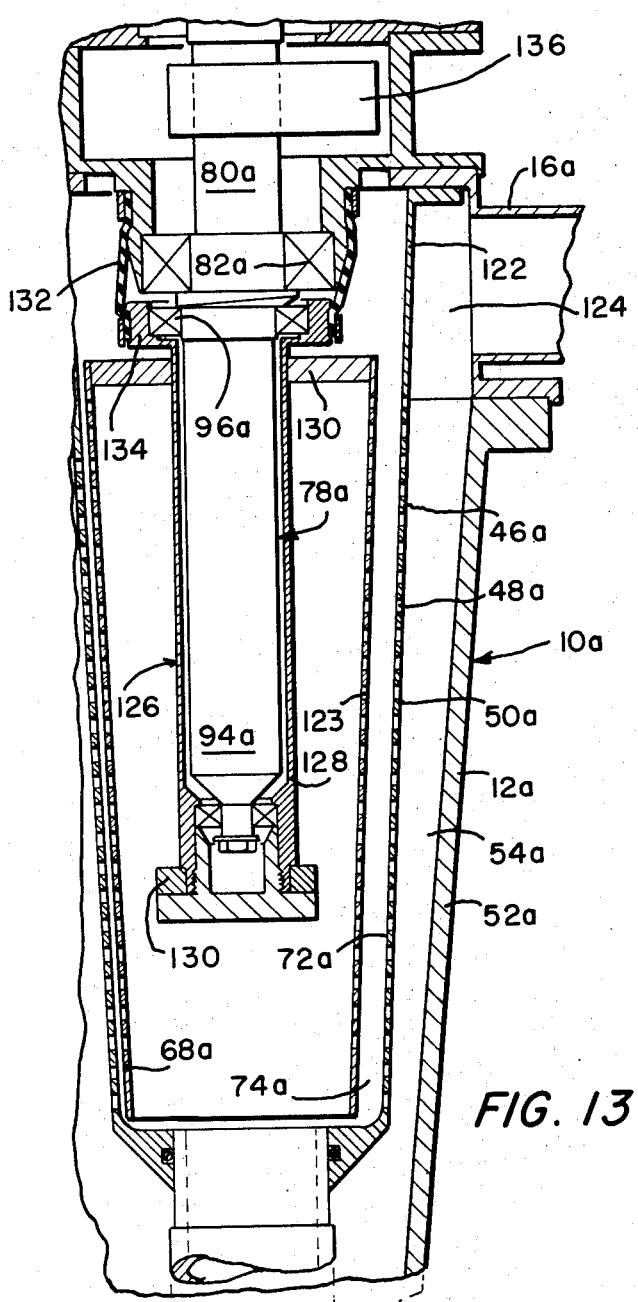
Figure 14:
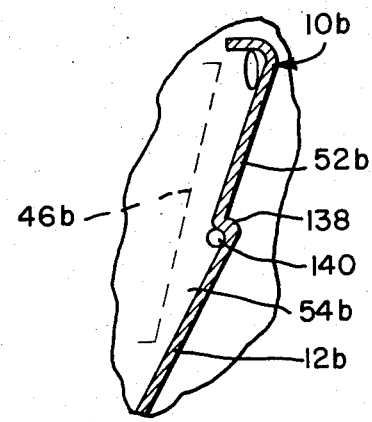
Figure 15:
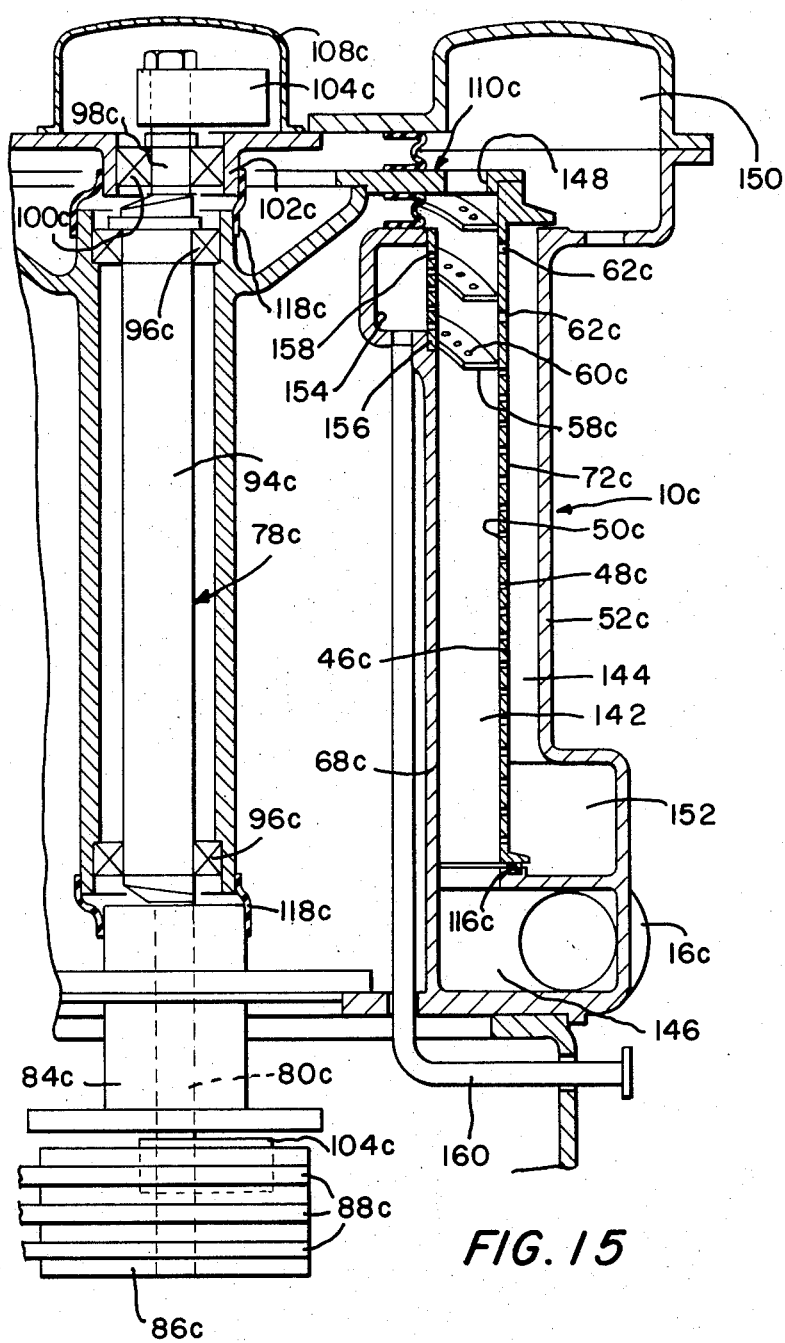
Figure 16:
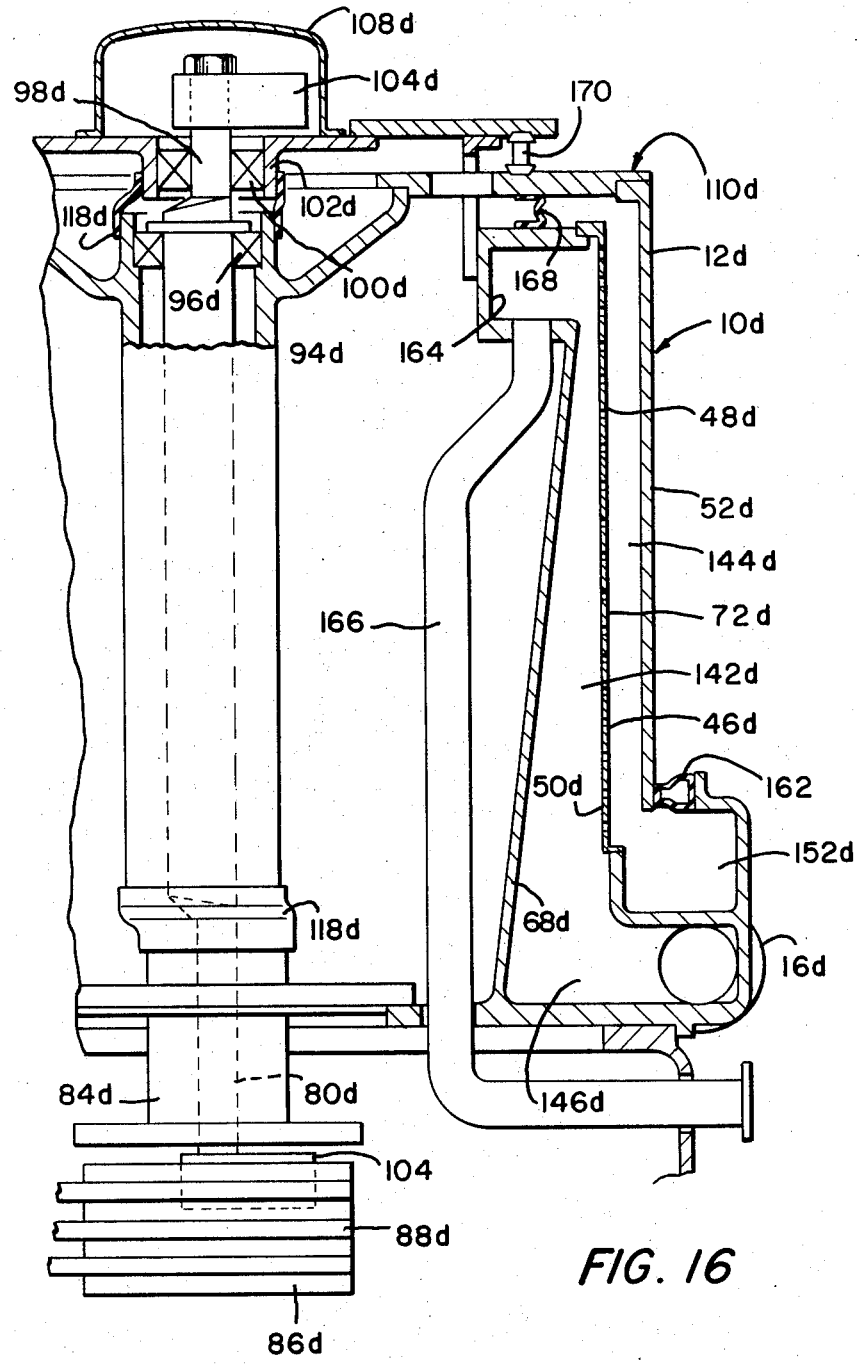

FIG. 13 is a fragmentary, elevational sectional view of an apparatus constructed in accordance with one alternative embodiment of the invention; and FIGS. 14 through 16 are fragmentary, elevational sectional views illustrating apparatus constructed in accordance with other alternative embodiments of the invention. e Referring more particularly to the drawings wherein similar reference characters designate corresponding parts throughout the several views, FIGS. 1 through 5 illustrate an embodiment of the invention in the form of an apparatus, designated generally as 10, which is particularily adapted for the coarse screening of a liquid suspension containing solid material such as, for example, a slurry containing knots.

Figure 4:
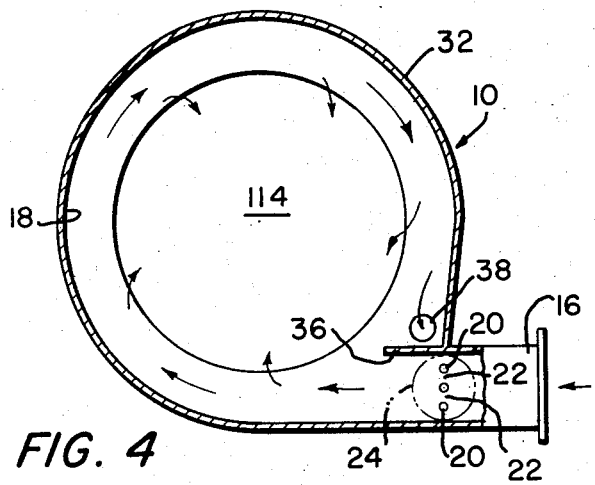
FIG. 4 is a reduced size sectional view illustrating the inlet gutter of the apparatus shown in FIG. 1.
Figure 8:
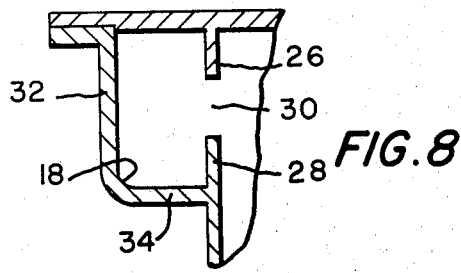
FIG. 8 is a fragmentary sectional view illustrating an alternative form of pre-screening means suitable for employment in the FIG. 1 apparatus.
Figure 9:
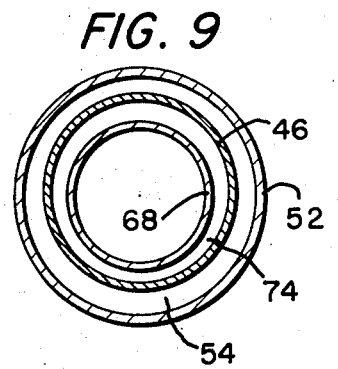
FIGS. 9 through 12 are views schematically depicting the operation of the FIG. 1 apparatus.
Figure 10:
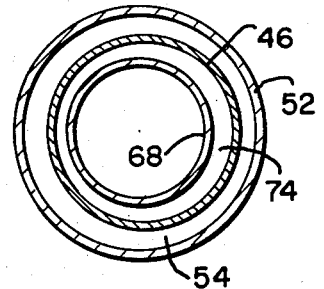
Figure 11:
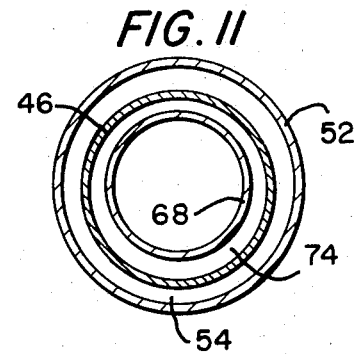
Figure 12:
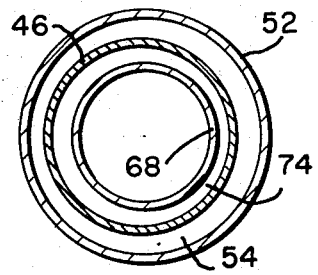

As shown in FIG. 1, the apparatus 10 comprises a generally vertical, pressurized casing 12 which is supported by a ground-mounted base 14. The casing 12 adjacent its upper end includes a tangental inlet or inlet conduit 16 which, during the operation of the apparatus 10, is connected through suitable conventional piping (not shown) to a pressurized source of the suspension to be fractionated and continuously introduces the suspension from such source into a generally annular inlet gutter 18 within the upper end of the casing 12. The inlet 16 contains a pre-screening means for preventing the passage of large solid material, such as rocks, bolts, and the like, into the inlet gutter 18. As best shown in FIGS. 3 and 4, this pre-screening means may comprise a plurality of rod-like elements 20 laterally spaced across the inlet 16 and therebetween defining restricted openings 22 through which the suspension must pass to reach the inlet gutter 18. Also, as illustrated, the rod-like elements 20 may be affixed to a single or common cleanout cover 24 which is threadily connected to the casing 12, thereby permitting ready access to the large solid material collected by the rod-like elements 20 by removal of the cleanout cover 24 and its carried rod-like elements 20 during shut-down of the apparatus 10. Alternatively, however, this pre-screening means may be of other suitable construction and, as shown in FIG. 8, may, for example, comprise a plurality of annular wall elements 26, 28 located along the inner side of the inlet gutter 18 and therebetween defining a restricted annular opening 30.

The inlet gutter 18 along its outer side is bounded by the outer wall 32 of an enlarged portion of the casing 12 and along its bottom is bounded by an annular casing wall 34 defining the lower end of the enlarged casing portion. An imperforate wall 36 extends transversely in the inlet gutter 18 from the outer periphery thereof at the side of the inlet 16 leading in the direction of the flow of suspension through the inlet gutter 18; and immediately before the wall 36 the gutter bottom wall 34 includes an outlet opening 38 connected to a discharge pipe 40. Hence, during the flow of suspension through the inlet gutter 18, heavier solid material in the suspension, being thrown outwardly to the wall 32 by centrifugal force, encounters the wall 36 and is discharged through the outlet 38 and the pipe 40.

The casing 12 adjacent its lower end includes an accepts outlet or outlet conduit 42 and a rejects outlet or outlet conduit 44. During the operation of the apparatus 10, the accepts outlet 42 is connected to conventional piping (not shown) arranged to discharge the accepted fraction of the suspension from the apparatus 10; and the rejects outlet 44 is similarily connected to conventional piping (not shown) arranged to suitabley discharge the rejected fraction of the suspension from the apparatus 10. An annular, cylindrical screen or screen plate 46, having screening apertures or openings 48 adapted for accepting a fraction of a suspension while rejecting another fraction thereof, is movably disposed wihtin the casing 12 on a generally vertical axis. The annular, outer or screening side face 50 of the screen 46 is spaced from the surrounding annular wall 52 of the casing 12 by an annular screening passage 54 which at its upper end is open to communication with the inlet gutter 18 and at its lower end communicates through an annular rejects chamber 56 with the rejects outlet 44 whereby, during operation of the apparatus 10, suspension flows from the inlet gutter 18 to the upper end of the screening passage 54 and the rejected fraction of the suspension is discharged from the lower end of the screening passage 54 through the rejects chamber 56 and rejects outlet 44.

Figure 5:
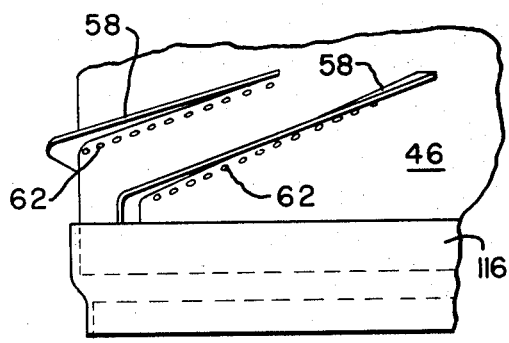
FIG. 5 is a fragmentary elevational view illustrating the lower end of the orbiting element of the apparatus shown in FIG. 1.
Figure 6:
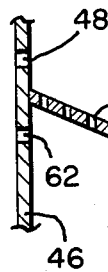
FIG. 6 and 7 are fragmentary, elevational sectional views showing alternative forms of spiral flights suitable for use on the orbiting element of the FIG. 1 apparatus.
Figure 7:
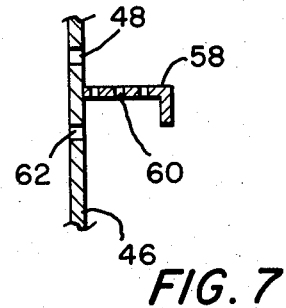

A plurality of spiral plates or flights 58, each as illustrated including a plurality of openings 60 therethrough, are rigidly mounted on the screen 46 and project from the screening side face 50 into the screening passage 54 adjacent the lower end of the latter, that is adjacent the end of the screen 46 nearest to the connection of the screening passage 54 to the accepts chamber 56. As best illustrated in FIG. 5, the portion of the screen 46 carrying the flights 58 includes one or more spiral rows 62 of screening openings 48 therethrough immediately below each of the flights 58. Opposite the spiral flights 58 the casing wall 52 is formed to include an annular dilution liquid supply chamber 64 open throughout its annular inner periphery to the screening passage 54 for supplying dilution liquid adjacent to the screening side face 50 at the location of the spiral flights 58. The dilution supply chamber 64 communicates through a dilution inlet or inlet conduit 66, formed integrally with the casing 12, with a source (not shown) of pressurized water or other dilution or elutriation liquid and, throughout the operation of the apparatus 10, supplies the liquid through its open inner periphery to the screening passage 54. Hence, the flights 58 and supplied liqid cooperate during the operation of the apparatus 10, to facilitate the downward movement of the rejected fraction of the suspension through the lower portion of the screening passage 54.

An imperforate, annular, cylindrical wall member 68, coaxial with the screen 46, is disposed within the screen 46 with its annular outer side face 70 spaced from the annular, inner or accepts side face 72 of the screen 46 a therebetween annular accepts space or passage 74. The accepts space 74 at its lower end communicates with an annular accepts chamber 76 to which is tangentially connected the accepts outlet 42. The imperforate wall member 68, as shown in FIG. 1, is stationary and formed integrally with the casing 12.

The apparatus 10 includes driving means particularly constructed and arranged for orbitally driving the screen 46; and the screen 46 is particularly mounted whereby, although orbitally movable by the driving means relative to the wall member 68, it is restrained from rotation. More specifically, the screen driving means comprises a rotatable driving shaft, designated generally as 78, at its lower end including a first or connectible portion 80 which is adapted for connection to a rotary driving motor and rotatably mounted by bearings 82 on a bearing pedestal 84 for rotation about its longitudinal axis.

The connectible portion 80, as illustrated, at its lower end carries a sheave 86 which is connected by a plurality of driving belts 88 with a sheave 90 rotatably driven by a rotary output driving motor shown fragmentarily as 92. The driving shaft 78 also includes a second or eccentric portion 94, integral with the connectible portion 80, which is formed with its longitudinal axis eccentric to, or offset from, that of the shaft connectible portion 80. The eccentric portion 94, as illustrated in FIG. 1, projects upwardly from the shaft connectible portion 80 coaxially through the imperforate wall member 68 and screen 46 and is provided with ball or roller bearings 96 at spaced locations along its length. The driving shaft 78 at its upper end includes an end portion 98, coaxial with the connectible portion 80 and integral with the eccentric portion 94, which is rotatably mounted by bearings 100 on an annular fixed support 102. The shaft end portion 98 and eccentric portion 94 carry balancing weights 104, 106 respectively, which generate forces to counter the unbalanced forces resulting from rotation of the shaft eccentric portion 94 and the resultant hydrodynamic forces and orbiting of the screen 46. The upper end of the driving shaft 78 is enclosed by a cover 108 detachable from the casing 12 to permit ready access thereto.

The screen 46 is mounted to the shaft eccentric portion 94 by a hereinafter described connecting means such that the driven rotation of the shaft 78 by the motor 92 causes the beforesaid orbital movement of the screen 46. This connecting means comprises the bearings 96 and a mounting frame, designated generally as 110, which includes an elongated, central sleeve or hub portion 112 directly mounted on the bearings 96 and a cover portion 114 which is integrally formed with the hub portion 112 and rigidly affixed to the upper end of the screen 46. Rotation of the screen 46 is prevented during its orbital movement by a restraining means which, as illustrated, comprises an annular resilient sleeve 116 connecting the lower end of the screen 46 to the casing 12, annular resilient sleeves 118 connecting the ends of the hub portion 112 to the annular fixed support 102 and the pedestal 84, and an annular resilient sleeve 120 which connects the mounting frame 110 to the upper end of the stationary wall member 68. The resilient sleeves 116, 118, 120 as will be noted, prevent fluid leakage at their respective locations and hence both restrain the screen 46 from rotation and also serve as seals. It will be understood, however, that, alternatively to the sleeves 116, 118, 120, the screen 46 could be restrained from rotation by other suitable means such as, for example, by mechanical linkage means (not shown).

Throughout the operation of the apparatus 10, pressurized liquid suspension containing solid material, such as a slurry containing knots, is continuously introduced into the casing 12 through the inlet 16. Solid material in the suspension of minor dimension greater than the openings 22 between adjacent ones of the rod-like elements 20 of the pre-screening means is, however, prevented by such pre-screening means from passing through the inlet 16; and, hence, rocks and other large foreign solid material are unable to enter the screening passage 54 where they might cause extensive damage to the apparatus 10. The large solid material collected by the pre-screening means is, as beforedescribed, manually cleaned-out from the inlet 16 after removal of the cover 24 during subsequent shut-down of the apparatus 10. The suspension introduced through the inlet 16 flows into the generally annular, inlet gutter 18 wherein heavier solid material remaining in the suspension, being thrown outwardly to the wall 32, encounters the wall or barrier 36 and is removed from the apparatus 10 through the outlet 38 and pipe 40.

The remainder of the suspension, however, passes from the inlet gutter 18 into the upper end of the screening passage 54 where it is divided by the screen 46 into an acceptable fraction passing inwardly through the screen openings 48 into the annular accepts space 74 and a rejected fraction which is rejected by the openings 48. The accepted fraction of the suspension flows downwardly through the accepts space 74 to the accepts chamber 76 and is subsequently discharged from the latter by the accepts outlet 42. The rejected fraction of the suspension is discharged from the screening passage 54 through the rejects chamber 76 to the rejects outlet 44, the flights 58 and liquid supplied by the dilution liquid supply chamber 64 cooperating to assist or facilitate the advancement of the rejected fraction of the suspension through the lower portion of the screening passage 54, while such liquid carries the remaining acceptable fraction through the thereadjacent screening openings 48.

Throughout such operation, the driving shaft 78 is continuously rotatably driven by the driving motor 92 through the sheaves 86, 90 and the driving belts 88. The driven rotation of the shaft eccentric portion 94 causes the latter to, through the bearings 96, continuously provide orbital movement of the screen 46 and its mounting frame 110 relative to the wall member 68 and the casing wall 52. Rotation of the screen 46 and mounting frame 110 is, however, restrained by the resilient sleeves 116, 118, 120.

Hence, throughout the operation of the apparatus 10, the screen 46 is continuously orbitally driven through an infinitely large number of successive orbital positions, each of which positions varies the cross-section of portions of the accepts space 74 and the screening passage 54. Four of the multiplicity of positions of the orbital screen 46, spaced 90 degrees apart, are shown for the purposes of illustration in FIGS. 9 through 12. As the accepts space 74 and the screening passage 54 are filled with suspension, the orbital movement of the screen 46 causes commensurate pressure variations therein, thereby providing pressure pulses across the screen 46. Also, as the tangential component of the velocity of the suspension in the accepts space 74 and the screening passage 54 varies transversely with the cross-section thereof, cyclical change of the tangential velocity of such suspension results. With regard to each particle of solid material in the suspension, there is provided a continuously and smoothly changing multi-dimensional velocity field of complex character with probable high shear gradients and low turbulence. The extent of the effects of the orbital movement of the screen 46, is, of course, dependent upon numerous variables, for example, the diameter and frequency of the orbit, the total open area of the screen 46, the cross-sectional width of the screening passage 54 and the annular space 74, and the viscosity of the liquid suspension. However, the extent of the orbit of the orbiting screen 46 is readily and simply controllable by the degree of eccentricity or off-set built into the shaft eccentric portion 94; and the balancing weights 104, 106 generate forces to counter the beforedescribed unbalanced forces.

FIG. 13, wherein parts similar to those of the screening apparatus 10 are designated by the corresponding reference numeral followed by the suffix a, fragmentarly illustrates a modified embodiment of the invention in the form of a fractionating apparatus 10a which is particularly adapted for fine screening and constructed such that an annular, conical inner wall member 68a, rather than the concentric, annular, conical screen 46a, is orbitally movable. As shown in FIG. 13, the upper end of the screen 46a is formed integral with an imperforate, annular conical baffle 122 rigidly mounted to the casing 12a and bounding the inner periphery of an annular inlet chamber 124 which communicates the inlet 16a with the upper end of the screening passage 54a. The lower end of the screen 46a rigidly carries the upper end of the depending accepts outlet or outlet conduit 42a which communicates with the annular accepts space or passage 74a and its lower end projects from the casing 12a for connection to conventional piping (not shown). The wall member 68a may be, as illustrated, provided with through openings or apertures 123 or, alternatively, may be imperforate in which event the lower end of the wall member 68a would be sufficiently short to permit therebelow inward flow of the accepted fraction.

The annular casing wall 52a is conical and of cone angle greater than that of the screen 46a to downwardly converge towards the latter in the direction from the inlet chamber 122 towards the communicating, annular rejects chamber 56a, thereby forming the screening passage 54a of progressively narrowing cross-section in such direction. However, as will be understood, the cone angles of the screen 46a and wall 52a could, if desired, be the same.

The drive shaft 78a projects downwardly into the upper end of the casing 12a with the eccentric portion 94a being an end portion thereof internally of the wall member 68a. The eccentric portion 94a is connected to the wall member 68a to orbitally drive the latter by a connecting means including the bearings 96a and a mounting frame 126, such mounting frame 126 including an annular mounting sleeve 128 which is directly supported on the bearings 96a and a plurality of mounting elements 130 rigidly interconnecting the sleeve 128 and the wall member 68a. Rotation of the wall member 68a during its orbital movement is restrained by a resilient annular band 132 interconnecting an enlarged portion 134 of the mounting sleeve 128 with the stationary casing 12a; and the orbit of the wall member 68a is, of course, again controlled by the degree of eccentricity or off-set built-in to the eccentric portion 94a.

The connectible portion 80a of the drive shaft 78a is rotatably mounted on bearings 82a and carries a balancing weight 136. The connectible portion 80a is at its upper end connected to a driving motor (not shown) to be rotatably driven thereby, in a manner similar to the arrangement provided for the driving shaft 78 of the screening apparatus 10.

Throughout the operation of the screening apparatus 10a, the driving shaft 78a is continuously rotably driven to cause the eccentric portion 94a thereof to orbitally drive the wall member 68a. Pressurzied liquid suspension containing solid material is continuously supplied to the inlet chamber 124 through the inlet 16a and flows downwardly to the screening passage 54a where the screen 46a separates the suspension into an acceptable fraction which passes inwardly through the screening openings 48a into the accepts space 74a and a rejected fraction which is discharged through the rejects chamber 56a to the rejects outlet 44a. The accepted fraction of the suspension flows from the accepts space 74a to the accepts outlet 42a, through the openings 123 in the wall member 68a.

FIG. 14, wherein parts similar to those of the apparatus 10 are designated by the corresponding reference numeral followed by the suffix b, fragmentarily and on a reduced scale illustrates an embodiment of the invention in the form of an apparatus 10b which is different from the apparatus 10a only in that the casing wall 52b is stepped to include an annular step 138 opposite the lower end of the screen 46b, and dilution inlet means 140 is provided for introducing dilution liquid to the screening passage 54b directly beneath the step 138.

The operation of the apparatus 10b is identical to that of the beforedescribed apparatus 10a, except that dilution or elutriation liquid is supplied through the dilution inlet means 140.

FIG. 15, wherein parts similar to those of the apparatus 10 are designated by the corresponding reference numeral followed by the suffix c, fragmentarily an embodiment of the invention in the form of an apparatus 10c particularly suited for coarse screening application.

The apparatus 10c is of the outward flow type whereby the screening side face 50c of the annular screen 46c is the annular inner side face thereof and the screen accepts side face 72c is its annular outer side face. The annular screening passage 142 of the apparatus 10c is, hence, formed inwardly of the screen 46c radially between the latter and the coaxial, stationary annular wall member 68c; and the annular accepts passage 144, being formed between the screen 46c and the annular casing wall 52c surrounds the screen 46c.

The inlet 16c is formed adjacent the lower end of the casing 12c and communicates with the lower end of the screening passage 142 through an annular inlet gutter 146, the inlet 16c containing pre-screening means (not shown) of the before-described type and the inlet gutter 146 being provided with a heavy material trap arrangement (not shown) similar to that included in the apparatus 10. The upper end of the screening passage 142 communicates through arcuate passages 148 with an annular rejects gutter 150, in turn, connected to the rejects outlet or outlet means (not shown). The lower end of the accepts passage 144 communicates through an annular chamber 152 with the accepts outlet or outlet conduit (not shown).

The upper end portion of the screen 46c rigidly carries a plurality of spiral flights 58c which projects from its screening side face 50c into the screening passage 142, the flights 58c having openings 60c therethrough and such upper end portion of the screen including one or more rows 62c of openings 48c therethrough immediately beneath each of the spiral flights 58c. Opposite to the flights 58c, the wall member 68c is formed to include an annular dilution liquid supply chamber 154 which communicates with the thereadjacent portion of the screening passage 142 through openings 158 in an annular screen 156 mounted to the wall member 68c.

The supply chamber 154 is connected to one end of a dilution liquid supply conduit 160 which at its other end projects from the casing 12c for connection to conventional piping (not shown), in turn, communicating with a pressurized source of water or other dilution or elutriation liquid; and during the operation of the apparatus 10c pressurized dilution liquid is supplied through the supply conduit 160 to the chamber 154 from whence it flows to the screening passage 142 through the screen openings 156.

The screen 46c is the orbitally movable element of the aparatus 10c and is connected to the eccentric portion 94c of the drive shaft 78c by a mounting frame 110c including a sleeve portion 118c directly mounted on the bearing 96c.

The operation of the apparatus 10c is believed to be apparent from the preceeding description.

FIG. 16, wherein parts similar to those aforedescribed are designated by the corresponding reference character followed by the suffix d, illustrates an embodiment of the invention in the form of an apparatus 10d particularly suited for fine screening application. The apparatus 10d similarily to the apparatus 10c, is of the outward flow type; however, in the apparatus 10d, the annular screen 46d is rigidly mounted in fixed position on the annular stationary wall member 68d and the annular casing wall 52d is the orbital element. The casing wall 52d is connected to the eccentric portion 94d of the drive shaft 78d by a connecting means comprising a mounting frame 110d from which the wall 52d is suspended and a plurality of bearings, one of which is shown as 96d, directly connecting the sleeve 118d of the mounting frame 110d to the eccentric portion 94d. Leakage at the lower end of the wall 52d is prevented by an annular seal 162; and another annular seal 168 is provided for sealing at its location. The wall 52d is restrained from rotation by a plurality of annular resilient elements 118d and resilient elements 170.

The inlet and accepts outlet arrangements of the apparatus 10d are identical to those of the apparatus 10c; however, the rejects outlet arrangement is substantially different from the latter end includes an annular rejects chamber 164 formed in the upper end of the wall member 68d and a rejects outlet or outlet conduit 166 communicating with the rejects chamber 164 and adapted for connection to suitable conventional piping (not shown).

The operation of the apparatus 10d is believed to be apparent from the foregoing description.

From the preceeding description it will be seen that the invention provides new and improved means for accomplishing all of the the beforestated objects and advantages. It will be understood, however, that although only a few embodiments of the invention have been illustrated and hereinbefore specifically described, the invention is not limited merely to these few embodiments but rather contemplates other embodiments and variations with the scope of the following claims. For example, and not by way of limitation, the wall members 68, 68c, and 68d could be provided with openings similar to the openings 123 in the wall member 68b; and any of the beforedescribed embodiments could be modified to include features of others thereof.

Having thus described my invention, I claim:

1. Apparatus for fractionating a fluid suspension, comprising a casing having inlet means for introducing fluid suspension into said casing, a plurality of annular wall members spaced one inside the other within said casing, at least one of said wall members being a screen having an outer screening side face and an inner accepts side face and said screening side face of said screen bounding the inner side of a screening passage extending therearound, said screen including screening openings adapted for accepting a fraction of a fluid suspension supplied to its said screening side face while rejecting another fraction of such fluid suspension, said inlet means communicating with said screening passage for supplying fluid suspension to said screening side face of said screen, rejects discharge means communicating with said screening passage for discharging the fraction of the suspension rejected by said screen, accepts discharge means for discharging the fraction of the supsension accepted by said screen, a rotatable drive shaft including a portion connectible to a driving means and another portion eccentric to said connectible portion, driving means connected to said connectible portion of said drive shaft for rotatably driving said drive shaft through said connectible portion thereof, at least one of said wall members being orbitally movable, means connecting said orbitally movable wall member to said eccentric portion of said drive shaft to cause driven rotation of said drive shaft by said driving means to provide orbital movement of said orbitally movable wall member, means for restraining rotation of said orbitally movable wall member during its said orbital movement, and balancing means for countering the forces generated during operation of the apparatus.

2. Fractionating apparatus according to claim 1, wherein said wall members are on generally vertical axes, said screen is the only circumferentially perforate one of said wall members and also the outer one of said wall members, said screening passage is generally annular and generally vertical, said inlet means communicates with the upper end of said screening passage for supplying fluid suspension thereto, and the other side of said screening passage is bounded by a wall of said casing.

3. Fractionating apparatus according to claim 2, wherein said connecting means connects said screen to said eccentric portion of said drive shaft for said orbital movement.

4. Fractionating apparatus according to claim 3, further comprising means for supplying dilution liquid to said screening passage, said dilution liquid supplying means being connected to said screening passage only substantially spaced below the upper end of said screening passage.

5. Fractionating apparatus according to claim 3, wherein said annular wall members include an annular wall member spaced inwardly of said accepts face of said screen cooperating therewith to bound opposite sides of an annular accepts receiving chamber, and said screen is orbitally movable relative to such annular wall member.

6. Fractionating apparatus according to claim 3, further comprising generally annular gutter means within the upper end of said casing interconnecting said inlet means and said screening passage, and wall means defining a restricted opening through which fluid suspension must flow to pass from said inlet means to said screening passage through said gutter means, said opening preventing large material in the fluid suspension from so passing to said screening passage.

7. Fractionating apparatus according to claim 6, wherein said restricted opening communicates said gutter means with said screening passage.

8. Fractionating apparatus according to claim 7, wherein said restricted opening is disposed adjacent the inner periphery of said gutter means.

9. Fractionating apparatus according to claim 7, wherein said inlet means is tangentially connected to said gutter means, and further comprising wall means transversely to the flow of fluid suspension in said gutter means, and outlet means at the bottom of said gutter means adjacent said wall means for discharging material from said gutter means.

10. Fractionating apparatus according to claim 1, wherein said wall members are on generally vertical axes, said screen is the outer one of said wall members, said screening passage is generally annular and generally vertical, said inlet means communicates with the upper end of said screening passage for supplying fluid suspension to such upper end, the outer side of said screening passage is bounded by a wall of said casing, a said wall member internally of said screen cooperates with said accepts side face of said screen to bound opposite sides of a generally annular accepts receiving space, such wall member is circumferentially perforate, and said connecting means connects such wall member to said eccentric portion of said drive shaft for driven orbital movement relative to said screen.

11. Fractionating apparatus according to claim 10, wherein said casing wall and said screen relatively converge as they extend downwardly from the upper end of said screening passage, thereby causing said screening passage to be of downwardly decreasing annular cross-section.

12. Fractionating apparatus, according to claim 10, wherein said casing wall is stepped.

13. Fractionating apparatus according to claim 10, wherein said casing wall and said screen relatively converge as they extend downwardly from the upper end of said screening passage, thereby causing said screening passage to be of downwardly decreasing annular cross-section, and said casing wall is stepped.

14. Fractionating apparatus according to claim 1, further comprising pre-screening means in said casing defining a restricted opening through which fluid suspension must flow to pass from said inlet means to said screening side face, said restricted opening preventing large material in the fluid suspension from passing to said screening side face.

15. Fractionating apparatus according to claim 14, further comprising generally annular gutter means in said casing interconnecting said inlet means and said screening passage, and wherein said restricted opening communicates said gutter means with said screening passage.

16. Fractionating apparatus according to claim 15, wherein said restricted opening is disposed adjacent the inner periphery of said gutter means.

17. Fractionating apparatus according to claim 15, wherein said inlet means is tangentially connected to said gutter means, and further comprising wall means transversely to the the flow of fluid suspension in said gutter means, and outlet means at the bottom of said gutter means adjacent said wall means for discharging material from said gutter means.

18. Fractionating apparatus according to claim 17, wherein said restricted opening is disposed adjacent the inner periphery of said gutter means.

19. Fractionating apparatus according to claim 14, wherein said pre-screening means comprises a plurality of laterally spaced apart rod-like elements therebetween defining a plurality of said restricted openings.

* * * * *